Figure 1:
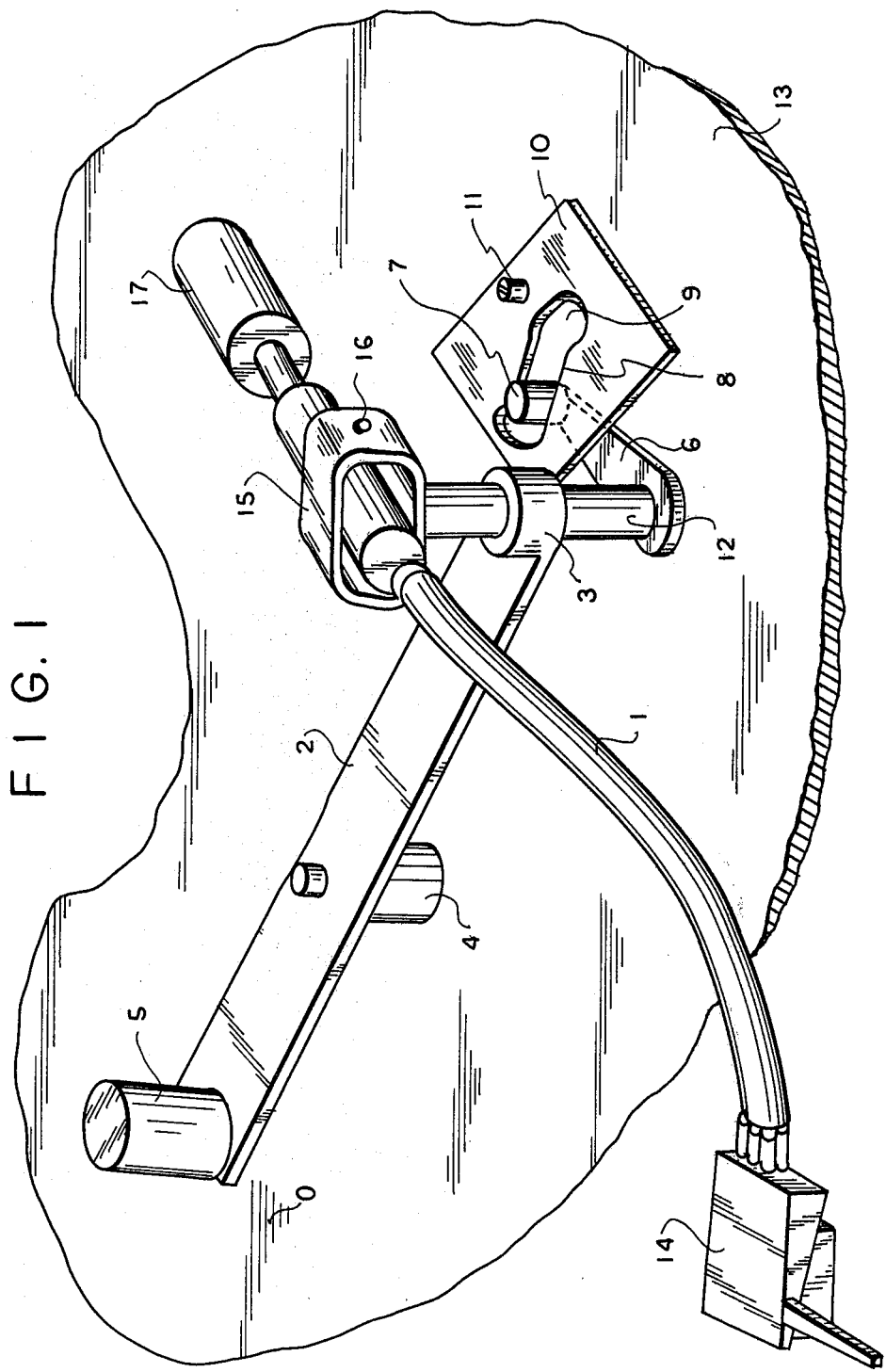

United States Patent [19]

Kanchev

[11] 4,346,466
[45] Aug. 24, 1982

[54] COMPENSATOR FOR HORIZONTAL ANGULAR ERROR OF A RECORD-PLAYER ARM

[75] Inventor: Peter K. Kanchev, Sofia, Bulgaria
[73] Assignee: Bulgarsko Radio, Sofia, Bulgaria
[21] Appl. No.: 155,134
[22] Filed: Jun. 2, 1980
[30] Foreign Application Priority Data
   May 31, 1979 [BG] Bulgaria .................................. 43792
[51] Int. Cl.³ .............................................. G11B 3/38
[52] U.S. Cl. .................................................. 369/250
[58] Field of Search ....................................... 369/250
[56] References Cited
   U.S. PATENT DOCUMENTS
   3,826,505 7/1974 Birch .................................. 369/250
   4,153,256 5/1979 Guha .................................. 369/250

Primary Examiner—Charles E. Phillips

[57] ABSTRACT

A mechanical compensator for the horizontal angular error of the playing arm of a record player. A lever is mounted upon and rotatable in a horizontal plane about a first bearing affixed to the base frame of the record player, the lever carrying a second bearing journalling a vertical shaft upon which the playing arm is mounted for joint rotation therewith. As the vertical shaft rotates during the second-tracking movement of the playing arm and the vertical shaft, a member affixed to the shaft is caused by a cam track to rotate the lever about the first bearing. The member affixed to the shaft may be a second lever having a cam follower which cooperates with a fixed cam, or the member affixed to the shaft may be a plate having a cam track therein which cooperates with a fixed cam follower.

1 Claim, 2 Drawing Figures

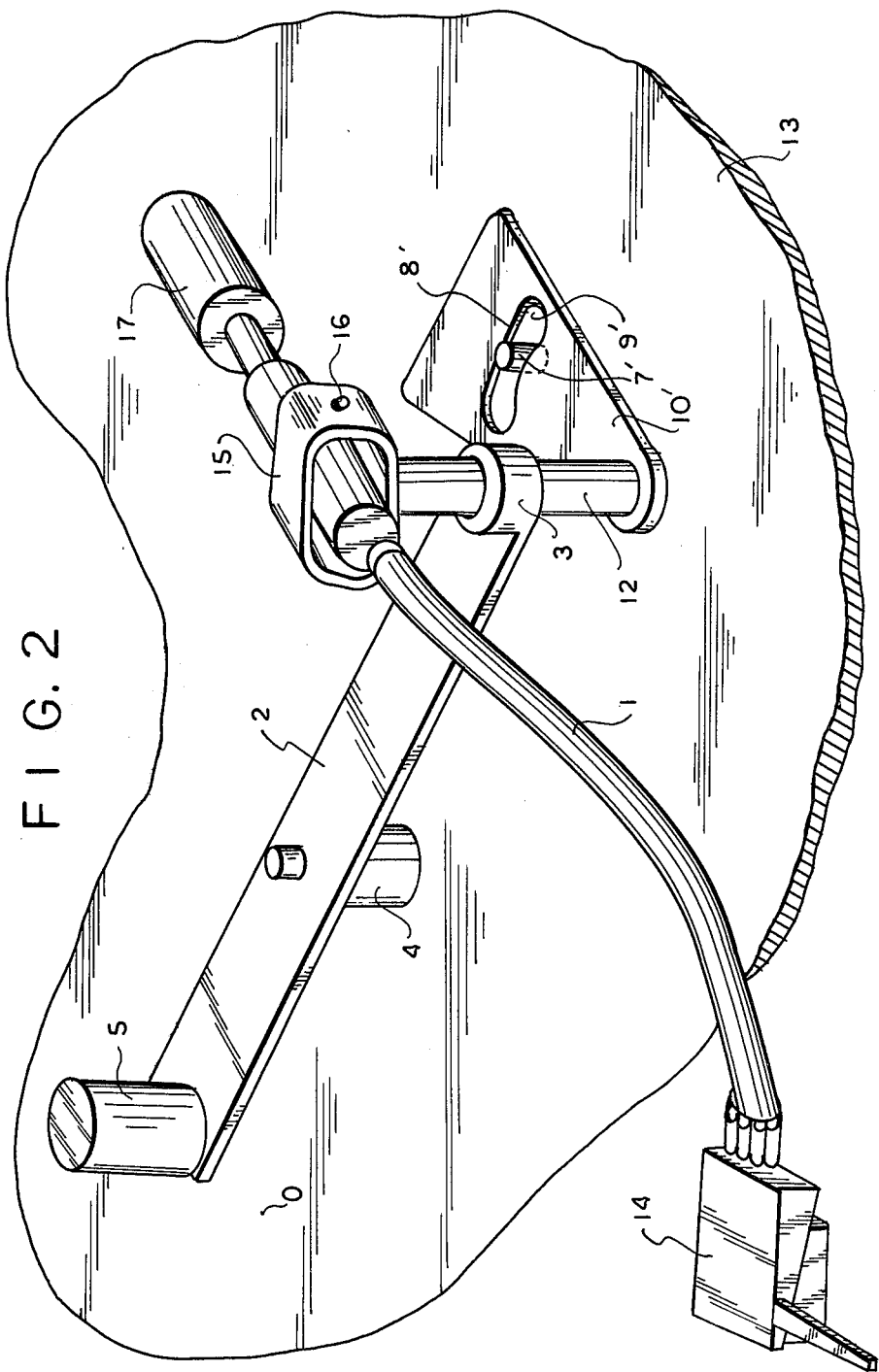

COMPENSATOR FOR HORIZONTAL ANGULAR ERROR OF A RECORD-PLAYER ARM

This application is related to Kanchev application Ser. No. 155,135, filed June 2, 1980.

This invention relates to a compensator for the horizontal angular error of a record-player arm. The compensator can be applied to record players that require the complete elimination of such angular error.

A self-compensating record-player arm is known having a variable correction angle and length. The exchange of the length of the player arm is effected by longitudinal adjustment of the pick-up which is mounted upon a slide disposed thereon. The longitudinal movement of the slide with the pick-up is controlled by a lever connected by a joint to one end of the slide. On the other end of the lever there is affixed a pin which moves in a shaped slit or cam track of a guide plate. The shell which carries the slide with the pick-up thereon is connected through joints to two levers and can change its position relative to them. The device which consists of the two levers, the shell with joint connections, and four bearings around which the arms move forms a parallelogram, the parallelogram insuring parallel movement of the pick-up in relation to a selected radius of the record being played. Longitudinal controlled movement of the slide with the pick-up insures that its movement coincides with the selected radius.

The above-described prior self-compensating record player arm has a number of disadvantages: It introduces additional friction as compared to the tradional record-playing arm in that it employs six bearings and two slides; there is a danger of twisting the entire system due to play in the bearings; the arm has a complex construction; the working pressure on the pick-up needle varies depending upon the length of the playing arm; the vertical tracking force of the needle upon the record varies depending upon the momentary working angle of the arm.

In an application filed contemporaneously herewith by the same inventor, Ser. no. 155,135, there is disclosed another compensator for the horizontal angular error of the record player arm. In such last compensator the correction of the angle is effected by changing the distance between the center of the record and the center of rotation of the arm by servo-mechanism and an optical sensor. The sensor includes a light source, a movable mask with a shaped slit which is mounted for horizontal rotation with the playing arm, and photosensitive means for receiving the beam of light transmitted through the movable mask. The servo-mechanism is fairly expensive.

The present invention has among its objects the provision of a compensator for the horizontal angular error of a record player arm which can be applied to all existing record player arms and which is of simplified construction.

In accordance with the invention, a lever is mounted upon and rotatable in a horizontal plane about a first bearing affixed to the base frame of the record player. The lever carries a second bearing journalling a vertical shaft upon which the playing arm is mounted for joint rotation therewith. As the vertical shaft rotates during the record-tracking movement of the playing arm and the vertical shaft, a member affixed on the shaft is caused by a cam track to rotate the lever about the first bearing, thereby appropriately changing the distance between the center of rotation of the record being played and the axis of the shaft upon which the playing arm is mounted. The member affixed to the shaft may be a second lever having a cam follower which cooperates with a fixed cam, or the member affixed to the shaft may be a plate having a cam track therein which cooperates with a fixed cam follower.

The compensator of the invention has a number of advantages: When mounted upon any traditional record playing arm it completely compensates for the horizontal angular error thereof; there is complete static balancing of the system; the vertical pressure of the needle upon the record and the tracking of the needle during the time when the compensator is operating are constant regardless of the angle through which the arm has rotated; the compensator of the invention does not employ an expensive servo-mechanism; finally, the construction of the compensator of the invention is very simple and thus it may be produced at a very modest cost.

The compensator of the invention is illustrated in preferred embodiments in the accompanying drawings, wherein:

FIG. 1 is a fragmentary view in perspective of a first embodiment of compensator in accordance with the invention; and FIG. 2 is a similar view of a second embodiment of compensator in accordance with the invention.

Turning first to FIG. 1, the compensator there shown has a carrying lever 2 which is mounted upon the base frame 13 of a record player through a bearing 4 for rotation in a horizontal plane. On the left-hand end of the carrying lever 2 there is affixed a counterbalance weight 5, weight 5 statically balancing the weight of the arm 1 of the record player. The other end of the carrying lever has a bearing 3 affixed thereto, bearing 3 mounting a rotatable vertical shaft 12 having a yoke 15 affixed to its upper end. The playing arm 1 is mounted upon yoke 15 by a horizontal pivot pin 16 which permits rotation of the playing arm 1 in a vertical plane. A pick-up 14 is mounted upon the left-hand end of the playing arm 1. On the other end of arm 1, to the right of the yoke 15, there is adjustably mounted a counterbalance weight 17.

Affixed to the lower end of the shaft 12 there is a second lever 6 which rotates about the axis of shaft 12 conjointly with the rotation of such shaft and of the playing arm 1. On its radially outer end the lever 6 carries a cam follower in the form of a roller 7 which rotates about a vertical axis. Roller 7 is received within a cam slit or slot 9 and cooperates with the opposite parallel edges 8 thereof. The cam slit or slot 9 is formed in a plate 10 which is mounted upon the base frame 13 of the record player by an adjusting screw 11 which permits limited adjustment of the plate 10 with respect to the axis of the shaft 12.

Turning now to FIG. 2, there is shown therein a second embodiment of the compensator of the invention, the difference between the two disclosed embodiments being essentially that in FIG. 2 the cam slot follower is mounted upon the base frame 13, whereas the cam slit or slot is disposed in a lever or plate affixed to the lower end of the shaft 12 for rotation therewith about the axis of such shaft. In FIG. 2 elements which are the same as those in FIG. 1, with the exception of those forming the cam slot and cam slot follower arrangement, are designated by the same reference characters as in FIG. 1. In FIG. 2 the lever or plate bearing the cam slot is designated 10', the cam following roller is designated 7', the cam slot or slit is designated 9', and the cooperating opposite parallel edges of the cam slot are designated 8'. It will be understood that the embodiments of the compensator shown in FIGS. 1 and 2 operate in essentially the same manner.

The disclosed compensator functions as follows: When the playing arm 1 is placed in its working position, the needle of the pick-up 14 contacts the groove of the record being played. The friction between the needle and the groove creates a force with a component directed toward the corresponding radius of groove (not shown). Such force is applied at the point of contact between the surface of the roller 7 (7') and the edge 8 (8') of the shaped slot 9 (9'), which insures the necessary contact between them. This contact is maintained for all positions of the roller 7 (7') within the shaped cam slot as a result of the mobility of the lever 2 in the arm 1. When the arm 1 rotates around the axis of the shaft 12 the roller 7 (7') rolls on the working edge 8 (8') of the shaped cam slot of the plate 10 (10'), which changes the distance between the axis of the shaft 12 and the center 0 of the record being played. This is possible, since the lever 2 rotates around the axis of the bearing 4. The compensator thus effects an optimal, controlled change of the distance between the axis of the arm 1 and the center 0 of the record.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

I claim:

1. A compensator for the horizontal angular error of a conventional playing arm of a disc record player having a base frame, comprising a bearing lever freely rotating about an intermediate point thereof in a horizontal plane upon a vertical axis, a vertical shaft rotatably mounted on the bearing lever at one end thereof, the playing arm being mounted for oscillation in a vertical plane on the upper end of said shaft and for rotation therewith in a horizontal plane, a counter-load statically balancing the whole system including the vertical shaft and the playing arm, said counter-load being mounted on the other end of the bearing lever, a compensating lever fixedly connected to the lower end of the shaft which supports the playing arm, said compensating lever extending radially from said shaft in a direction with respect to the length of the bearing lever which is opposite to the direction at which the center of the record lies with respect to the length of the bearing lever, a roller which freely rotates about a vertical axis mounted on the outer end of the compensating lever, and a horizontally disposed cam plate having a shaped slot therewithin, such slot accurately guidingly receiving the roller, and means adjustably affixing the cam plate to the base frame of the record player, said last named means including a screw by which the cam plate is affixed to the base frame and about which the cam plate is angularly adjustable.

* * * * *